US012562007B2

(12) United States Patent
Bruveris et al.

(10) Patent No.: US 12,562,007 B2
(45) Date of Patent: Feb. 24, 2026

(54) METHODS AND SYSTEMS FOR DETECTING FRAUD DURING BIOMETRIC IDENTITY VERIFICATION

(71) Applicant: Onfido Ltd., London (GB)

(72) Inventors: Martins Bruveris, London (GB); Mohan Mahadevan, London (GB); Romain Sabathe, London (GB); Sebastien Ehrhardt, London (GB); Theo Richard, London (GB); Mark Opland, London (GB)

(73) Assignee: Entrust Corporation, Shakopee, MN (US)

( * ) Notice: Subject to any disclaimer, the term of this patent is extended or adjusted under 35 U.S.C. 154(b) by 432 days.

(21) Appl. No.: 18/212,797

(22) Filed: Jun. 22, 2023

(65) Prior Publication Data

US 2023/0419737 A1      Dec. 28, 2023

Related U.S. Application Data

(60) Provisional application No. 63/355,906, filed on Jun. 27, 2022.

(51) Int. Cl.
*G06V 40/40* (2022.01)
*G06F 21/32* (2013.01)
(Continued)

(52) U.S. Cl.
CPC .............. *G06V 40/45* (2022.01); *G06F 21/32* (2013.01); *G06V 10/82* (2022.01); *G06V 40/165* (2022.01); *G06V 40/166* (2022.01); *G06V 40/172* (2022.01)

(58) Field of Classification Search
CPC ...... G06V 40/45; G06V 10/82; G06V 40/165; G06V 40/166; G06V 40/172; G06V 20/64; G06F 21/32
See application file for complete search history.

(56) References Cited

PUBLICATIONS

Liu Yaojie, et al., Presentation Attack Detection for Face in Mobile Phones; Advances and Challenges; In: Computer Vision and Machine Learning with RGB-D Sensors, Sep. 22, 2019, pp. 171-196 Springer International Publishing, Cham, XP055948328, ISSN:2191-6586, ISBN: 978-3-319-08651-4. Retrieved from the Internet: URL:http://cylab.cse.msu.edu/pdfs/Liu_Stehouwer_Jourabloc_Atoum_Liu_SelfieBiometrics_2019.pdf.

(Continued)

*Primary Examiner* — Wassim Mahrouka
(74) *Attorney, Agent, or Firm* — Merchant & Gould P.C.

(57) ABSTRACT

Described herein are computerized methods and systems for detecting fraud during biometric identity verification. A mobile device captures video comprising a plurality of frames of a person's face. The mobile device extracts from the video frames comprising at least two frames of the person's face from different angles. The mobile device creates a reconstruction of the person's face using the extracted frames and derives signals associated with features of the person's face. The mobile device generates an embedding for each extracted frame using the extracted frames, the three-dimensional reconstruction, and the signals. The mobile device calculates, for each extracted frame, a fraud confidence value based upon the embedding for the extracted frame, attributes of the person's face, and image quality attributes of the extracted image. The mobile device computes a fraud detection decision for the extracted frames based upon the fraud confidence values and the embeddings.

54 Claims, 8 Drawing Sheets

Capture video of a person's face 202

Extract frames comprising at least one frame of the person's face from each of a plurality of different angles 204

Create a three-dimensional (3D) reconstruction of the person's face 206

Derive one or more signals associated with features of the person's face 208

Generate an embedding for each extracted frame using the extracted frames, the 3D reconstruction, and the signals 210

Calculate a fraud confidence value for each extracted frame 212

Compute a fraud detection decision based upon the fraud confidence values and the embeddings 214

200

(51) Int. Cl.
  *G06V 10/82* (2022.01)
  *G06V 40/16* (2022.01)

(56) References Cited

PUBLICATIONS

Liu Yaojie, et al., Learning Deep Models for Face Anti-Spoofing: Binary or Auxiliary Supervision, 2018 IEEE/CVF Conference on Computer Vison and Pattern Recognition, IEEE, Jun. 18, 2018, pp. 389-398, XP033475999, DOI: 10.1109/CVR.2018.00048, [retrieved Dec. 14, 2018].

Zuheng Ming, et al., A Survey On Anti-Spoofing Methods For Face Recognition with RGB Cameras of Generic Consumer Devices, ARXIV.Org, Oct. 8, 2020, Cornell University Library, 201 Olin Library Cornell University Ithaca, NY 14853, XP081781682.

Shan Jia, et al., A Surve on 3D Mask Presentation Attack Detection and Countermeasures, Pattern Recognition, Elsevier GB, Sep. 5, 2019, vol. 98, XP0855886198, ISSN: 0031-3203, DOI: 10.1016/JPATCOG.2019.107032, [retrieved Sep. 5, 2005].

Yan Li, et al., Seeing Your Face Is Not Enough An Inertial Sensor-Based Liveness Detection For Face Authentication, User Interface Software Technology, Oct. 12, 2015, pp. 1558-1569, ACM, 2 Penn Plaza, Suite 701, New York, NY 10121-0701, USA, XP058521302, DOI: 10.1145/2810103.2813612, ISBN: 978-4503-4531-6.

Triggs et al., "Bundle Adjustment—A Modern Synthesis," International Workshop on Vision Algorithms, Sep. 2000, Corfu, Greece, pp. 298-372; Springer-Verlag, Berlin.

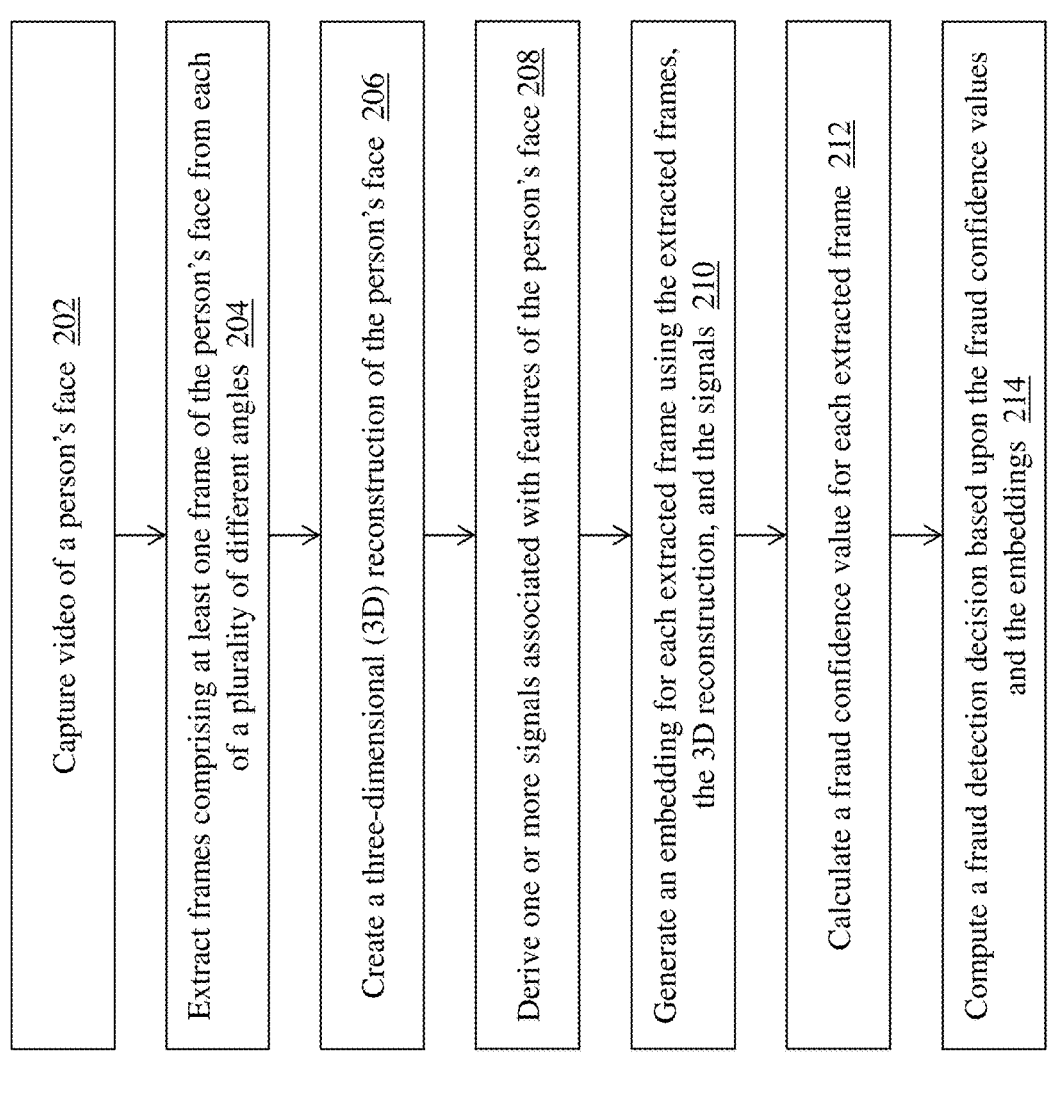

Capture video of a person's face  202

Extract frames comprising at least one frame of the person's face from each of a plurality of different angles  204

Create a three-dimensional (3D) reconstruction of the person's face  206

Derive one or more signals associated with features of the person's face  208

Generate an embedding for each extracted frame using the extracted frames, the 3D reconstruction, and the signals  210

Calculate a fraud confidence value for each extracted frame  212

Compute a fraud detection decision based upon the fraud confidence values and the embeddings  214

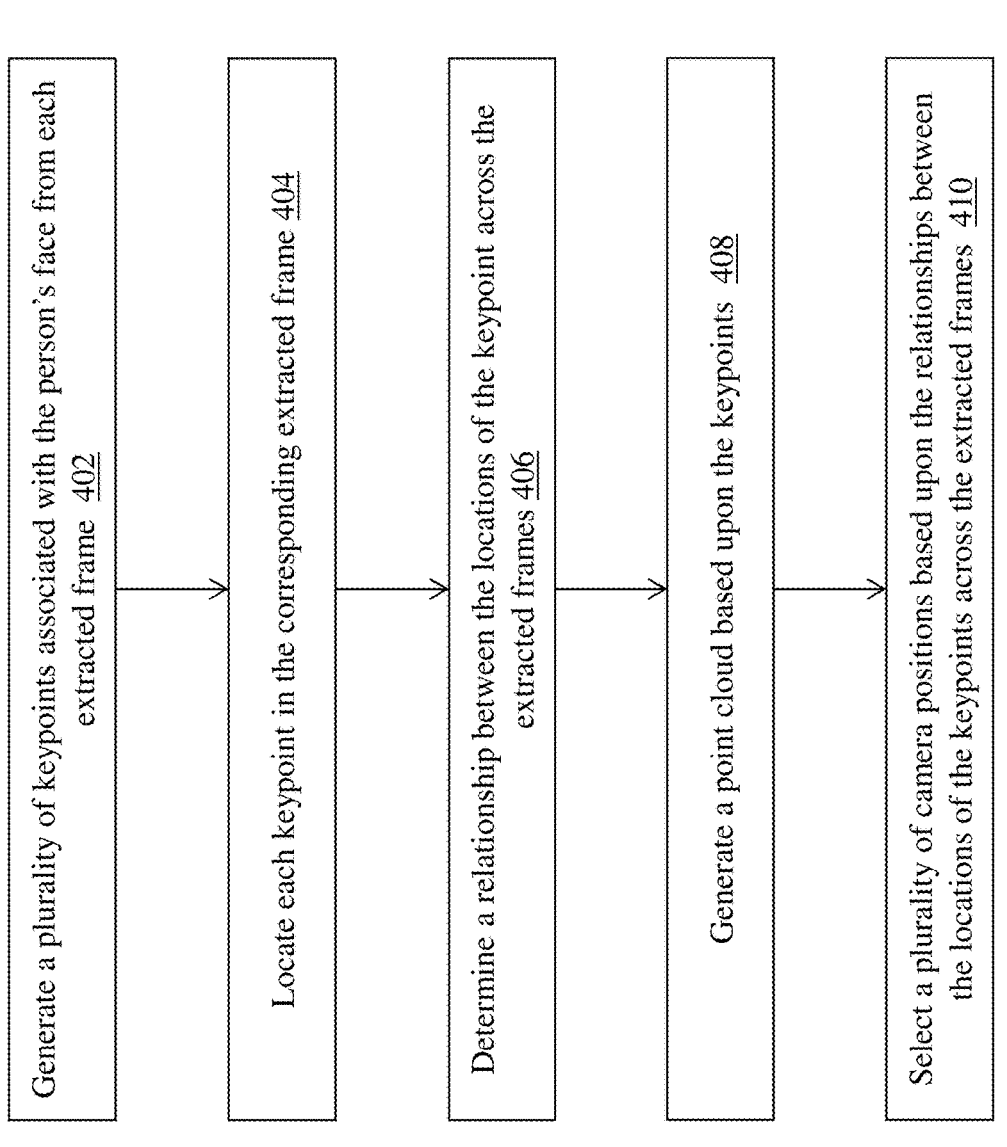

Generate a plurality of keypoints associated with the person's face from each extracted frame 402

Locate each keypoint in the corresponding extracted frame 404

Determine a relationship between the locations of the keypoint across the extracted frames 406

Generate a point cloud based upon the keypoints 408

Select a plurality of camera positions based upon the relationships between the locations of the keypoints across the extracted frames 410

502a
302a
FIG. 5

808b

808a

806b

804

Turn your head slowly to
both sides

802

806a

808c

800

METHODS AND SYSTEMS FOR DETECTING FRAUD DURING BIOMETRIC IDENTITY VERIFICATION

RELATED APPLICATIONS

This application claims priority to U.S. Provisional Patent Application No. 63/355,906, filed Jun. 27, 2022, the entirety of which is incorporated herein by reference.

TECHNICAL FIELD

The subject matter of the application relates generally to methods and systems for detecting fraud during biometric identity verification, including but not limited to using a three-dimensional reconstruction of a person's face to calculate a fraud confidence value during a remote biometric identity verification process.

BACKGROUND

Remote identity verification processes are typically conducted between a first user at a computing device (e.g., a mobile device like a smartphone) and a second user at a remote computing device, where the second user seeks to validate the identity of the first user. Typically, such verification processes rely on the first user capturing video of their face that is then processed and analyzed by the second user. As part of this process, it is important to confirm that the face of the first user is a genuine, live human face, and not a simulated or spoofed representation—such as a two-dimensional printout of the person's face, a person wearing a latex mask, a picture of another person's face, a video recording of a person's face, or a digital recreation of a face.

Existing liveness detection techniques suffer from several drawbacks. Such techniques may rely on specialized equipment like complex, expensive cameras or computing hardware to record high-quality video and generate a 3D reconstruction of a person's face from the video. Certain 3D reconstruction algorithms (e.g., ones using common feature extractors such as scale invariant feature transform (SIFT)) used by existing systems generate significant noise that can degrade the quality of the 3D reconstruction and result in a less accurate fraud detection decision. In addition, these systems can require a user to perform complicated, movement-intensive actions with their face and/or the mobile device to capture sufficient video frames so that a fraud detection decision can be rendered. Other systems rely upon a single image or video of a frontal-facing face. Those systems lack the necessary signals to be able to robustly distinguish between genuine faces and sophisticated 3D attacks.

SUMMARY

Therefore, what is needed is are methods and systems for automatically and dynamically assessing the genuineness of a person depicted in a video captured by a mobile computing device using advanced machine learning facial analysis and fraud detection techniques. The techniques described herein beneficially combine a three-dimensional facial reconstruction, obtained from video of a person's face captured from multiple angles, with one or more attributes of the person's face (such as pose or size), and attributes of the image itself (including image quality characteristics) as input to an advanced deep learning framework to generate an embedding corresponding to the image that can be classified as genuine or fraudulent.

Beneficially, the methods and systems allow for a rapid fraud detection decision via mobile device that is robust to various types of spoofing and other fraud attempts that existing facial analysis techniques cannot accurately detect—e.g., spoofing attempts using 2D images or a recorded video of a person's face, use of latex masks with realistic features but lacking human textures, or eye cut outs. In addition, the techniques described herein use the 3D reconstruction from the video in order to determine whether the person behind the camera is a real, live human. The system beneficially does not use a color signal during the 3D reconstruction to result in better anonymization since it is naturally hard to recognize a person from the shape of their head without further information about the texture of their skin.

In addition, the methods and systems of the present technology provide for minimal interaction and motion of the end user while enabling a robust solution to the most common types of facial biometrics attacks. Live feedback from the end user's device enables the system to assess with certainty the presence of a genuine 3D human face behind the camera used for recording, while minimizing the amount of motion required by the user. Advantageously, the system enables capture of videos using common consumer devices (e.g., smartphones) instead of requiring specific hardware. In particular, it allows the use of relatively short videos (e.g., 1.5 to 15 seconds) captured at relatively low resolution and bit-rate to be used. As such, the systems can be used in large scale remote identity verification processes. Also, as mentioned above, a single-frame-based solution will eventually reach its limits when faced with a difficult fraud. The techniques presented herein avoid this limitation and provide increased protection through the use of video.

The invention, in one aspect, features a computer system for detecting fraud during biometric identity verification. The system comprises a mobile computing device coupled to an image capture device. The mobile computing device captures, using the image capture device, video comprising a plurality of frames of a person's face. The mobile computing device extracts from the video at least two frames of the person's face from each of a plurality of different angles. The mobile computing device creates a three-dimensional reconstruction of the person's face using the extracted frames. The mobile computing device derives one or more signals associated with one or more features of the person's face using the extracted frames and transmits the extracted frames, the three-dimensional reconstruction, and the one or more signals to a server computing device. The server computing device generates an embedding for each extracted frame using the extracted frames, the three-dimensional reconstruction, and the derived signals. The server computing device calculates, for each extracted frame, a fraud confidence value based upon the embedding for the extracted frame, one or more attributes of the person's face, and one or more image quality attributes of the extracted image. The server computing device computes a fraud detection decision for one or more of the extracted frames based upon the fraud confidence values and the embeddings.

The invention, in another aspect, features a computerized method of detecting fraud during biometric identity verification. A mobile computing device captures, using an image capture device coupled to the mobile computing device, video comprising a plurality of frames of a person's face. The mobile computing device extracts from the video at least two frames of the person's face from each of a plurality of different angles. The mobile computing device creates a three-dimensional reconstruction of the person's face using the extracted frames. The mobile computing device derives one or more signals associated with features of the person's face using the extracted frames and transmits the extracted frames, the three-dimensional reconstruction, and the one or more signals to a server computing device. The server computing device generates an embedding for each extracted frame using the extracted frames, the three-dimensional reconstruction, and the derived signals. The server computing device calculates, for each extracted frame, a fraud confidence value based upon the embedding for the extracted frame, one or more attributes of the person's face, and one or more image quality attributes of the extracted image. The server computing device computes a fraud detection decision for one or more of the extracted frames based upon the fraud confidence values and the embeddings.

Any of the above aspects can include one or more of the following features. In some embodiments, during capture of the video, the mobile computing device generates instructions for movement of the person's head in one or more directions relative to the image capture device. In some embodiments, the instructions comprise a user interface for display to the person, the user interface comprising: a view of the person's face, a first visual indicator on a left side of the view of the person's face, and a second visual indicator on a right side of the view of the person's face, wherein one or more appearance characteristics of the first visual indicator change as the person's head rotates to the right, and wherein one or more appearance characteristics of the second visual indicator change as the person's head rotates to the left. In some embodiments, the first visual indicator and the second visual indicator each comprises a line.

In some embodiments, one or more of a color or a thickness of at least a portion of the line for the first visual indicator changes as the person's head rotates to the right, and one or more of a color or a thickness of at least a portion of the line for the second visual indicator changes as the person's head rotates to the left. In some embodiments, the entire line for the first visual indicator changes color and thickness when the person's head has rotated a minimum number of degrees to the right, and the entire line for the second visual indicator changes color and thickness when the person's head has rotated a minimum number of degrees to the left. In some embodiments, the mobile computing device generates one or more of an audible alert or a haptic alert when the person's head has rotated a minimum number of degrees to the right and a minimum number of degrees to the left during capture of the video. In some embodiments, the mobile computing device stops capturing the video when the person's head has rotated a minimum number of degrees to the right and a minimum number of degrees to the left. In some embodiments, the mobile computing device determines that the captured video comprises enough frames to enable the server computing device to compute a fraud detection decision prior to stopping the video capture. In some embodiments, the mobile computing device restarts the video capture when the mobile computing device determines that the captured video does not comprise enough frames to enable the server computing device to compute a fraud detection decision.

In some embodiments, creating a three-dimensional reconstruction of the person's face using the extracted frames comprises generating a plurality of keypoints associated with one or more geometrical locations on the person's face from each extracted frame, where the geometrical locations are associated with higher levels of 3D variation; for each keypoint: locating the keypoint in each extracted frame; and determining a relationship between the locations of the keypoint across the extracted frames; generating a point cloud based upon the keypoints; and selecting a plurality of camera positions based upon the relationships between the locations of the keypoints across the extracted frames, where for each extracted frame, an orientation of the camera is biased toward a face orientation. In some embodiments, the camera positions are selected based upon a minimized reprojection error for the associated keypoints. In some embodiments, generating a plurality of keypoints associated with one or more geometrical locations on the person's face from each extracted frame comprises identifying one or more facial landmarks of the person's face, the facial landmarks collectively covering the full face, and generating one or more keypoints corresponding to each of the facial landmarks. In some embodiments, the mobile computing device removes one or more keypoints that are located outside of the person's face.

In some embodiments, deriving one or more signals associated with features of the person's face using the extracted frames comprises determining one or more features of the person's face using the extracted frames, and deriving the one or more signals based upon the determined features of the person's face. In some embodiments, the one or more features of the person's face comprise contour lines of the person's face, regions of the person's face, or both.

In some embodiments, generating an embedding for each extracted frame based upon the extracted frames, the three-dimensional reconstruction, and the derived signals comprises, for each extracted frame, executing a machine learning classification model using the extracted frame, the three-dimensional reconstruction, and the derived signals as input to generate the embedding. In some embodiments, the machine learning classification model comprises an ensemble of supervised and unsupervised neural networks. In some embodiments, the one or more attributes of the person's face for calculating the confidence value comprise face pose, face size, and face detection confidence.

In some embodiments, the one or more image quality attributes of the extracted image comprise image corrections, white balance, brightness, blurriness, and contrast. In some embodiments, the fraud confidence values associated with each extracted frame are aggregated to generate an overall fraud confidence value. In some embodiments, computing a fraud detection decision based upon the fraud confidence values for one or more of the extracted frames comprises comparing the overall fraud confidence value to a fraud confidence threshold, determining that the person in the video is genuine when the overall fraud confidence value falls below the fraud confidence threshold, and determining that the person in the video is fraudulent when the overall fraud confidence value meets or exceeds the fraud confidence threshold. In some embodiments, the mobile computing device displays the fraud detection decision to the person. In some embodiments, the server computing device transmits the fraud detection decision to a remote computing device for display to a user of the remote computing device.

In some embodiments, one or more sensors coupled to the mobile computing device record movement characteristics of the mobile computing device during capture of the video by the image capture device. In some embodiments, the movement characteristics include rotation and acceleration. In some embodiments, the server computing device uses the recorded movement characteristics as input when computing the fraud detection decision.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 2 is a flow diagram of a computerized method of detecting fraud during biometric identity verification.

FIG. 4 is a flow diagram of a computerized method of creating a 3D reconstruction of the person's face using the extracted frames.

FIG. 5 is a diagram of an exemplary extracted frame of a person's face with keypoints generated by 3D reconstruction module.

DETAILED DESCRIPTION

Figure 1:
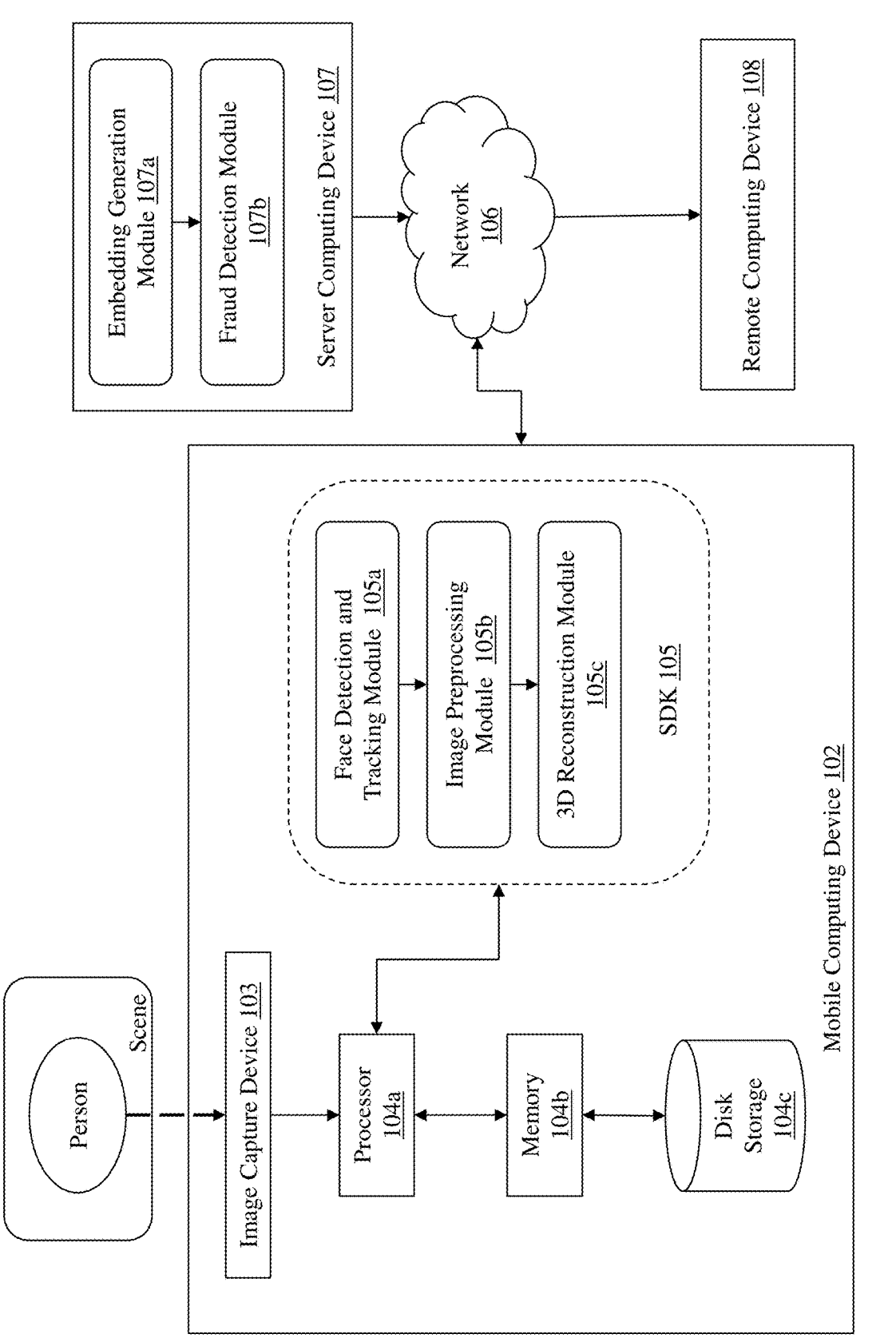
FIG. 1 is a block diagram of a system for detecting fraud during biometric identity verification.

FIG. 1 is a block diagram of a system 100 for detecting fraud during biometric identity verification. The system 100 includes a mobile computing device 102 that comprises image capture device 103, processor 104a, memory 104b, disk storage 104c, and software development kit (SDK) 105. Image capture device 103 is configured to capture video of a person in a scene—in particular, capturing video of the person's face. The SDK 105 includes a plurality of modules: face detection and tracking module 105a, image preprocessing module 105b, and three-dimensional (3D) reconstruction module 105c. In some embodiments, the mobile computing device 102 is coupled to server computing device 107 and remote computing device 108 via network 106. The server computing device 107 includes embedding generation module 107a and fraud detection module 107b.

The mobile computing device 102 is a device including specialized hardware and/or software modules (e.g., SDK 105 and corresponding modules 105a-105c) that execute on processor 104a and interact with memory 104b and disk storage 104c of the mobile computing device 102, to receive, process, and transmit data, and perform functions for detecting fraud during biometric identity verification as described herein. In some embodiments, the SDK 105 and its modules 105a-105c are specialized sets of computer software instructions programmed onto one or more dedicated processors (e.g., processor 104a) in the mobile computing device 102 and can include specifically-designated memory locations and/or registers for executing the specialized computer software instructions. In one embodiment, the SDK 105 comprises a single software application (e.g., an 'app') or plug-in that is installed on the mobile computing device 102.

The mobile computing device 102 also comprises an image capture device 103. In some embodiments, the image capture device 103 comprises a camera that is capable of capturing video and still images of a scene. For example, a user of mobile computing device 102 may be positioned in the field of view of image capture device 103 such that the mobile computing device 102 records video comprising one or more frames of the user's face using image capture device 103. As can be appreciated, in some embodiments the frames of the user's face can also include other features of the user, including but not limited to neck, shoulders, chest, torso, ears, etc. As shown in FIG. 1, image capture device 103 is integrated into mobile computing device 102—an example might be a smartphone that includes an embedded camera. It should be appreciated that in other embodiments, image capture device 103 may be a separate device from mobile computing device 102, which is coupled to mobile computing device 102 via a wired or wireless connection.

Exemplary computing devices 102 include, but are not limited to, tablets, smartphones, laptop computers, and the like. It should be appreciated that other types of computing devices (e.g., desktop computers, Internet of Things (IoT) devices, smart appliances, wearables) that are capable of connecting to the components of the system 100 can be used without departing from the scope of invention. Although FIG. 1 depicts a single mobile computing device 102, it should be appreciated that the system 100 can include any number of mobile computing devices.

As mentioned above, in some embodiments SDK 105 comprises an application that is installed on mobile computing device 102—also called a native application or "app". The native application can be a software application which is installed locally on mobile computing device 102 and written with programmatic code designed to interact with an operating system that is native to mobile computing device 102. Such software may be available for download onto the device 102 from, e.g., the Apple® App Store or the Google® Play Store. In some embodiments, SDK 105 and its modules 105a-105e are executed by processor 104a to perform functions associated with detecting fraud during biometric identity verification as described herein. The native application can be executed when the mobile computing device 102 is online—that is, communicatively coupled to network 106—or offline. In some embodiments, the offline mode feature can provide a benefit to the security and usability of the fraud detection process described herein—such as enabling fraud detection in situations where a network connection is not available, or where transmission of facial image data over a network is not desired (e.g., where a threat actor may try to intercept or misappropriate such data). In these embodiments, the mobile computing device 102 can perform the fraud detection processing described herein and render a fraud detection decision to a user of mobile computing device 102 and/or one or more other persons in proximity to the user via a display screen of the mobile computing device 102.

It should be appreciated that, in some embodiments, SDK 105 and/or one or more of its modules 105a-105c can be provided via a browser application, which comprises software executing on processor 104a of mobile computing device 102 that enables mobile computing device 102 to communicate via HTTP or HTTPS with remote servers addressable with URLs (e.g., web servers) to receive website-related content, including one or more webpages that contain user interface content, for rendering in the browser application and presentation on a display device coupled to mobile computing device 102. Exemplary mobile browser application software includes, but is not limited to, Firefox™ Chrome™, Safari™, and other similar software. The one or more webpages can comprise visual and audio content for display to and interaction with a user of device 102, including application functionality for detecting fraud during biometric identity verification.

Although SDK 105 and its modules 105*a*-105*c* are shown in FIG. 1 as executing within a single mobile computing device 102, in some embodiments the functionality of one or more of the modules 105*a*-105*c* of SDK 105 can be distributed among a plurality of computing devices. It should be appreciated that, in some embodiments, certain mobile computing devices may lack sufficient hardware or software capability—such as processing power, data storage capacity, communication circuitry, operating system features—to satisfactorily execute the SDK 105 and/or one or more of the computing modules 105*a*-105*c*. For example, an older model mobile device 102 may not be able to perform all steps of the facial analysis and fraud detection processes described herein within a desired or reasonable time frame. Therefore, in some embodiments, one or more of the modules 105*a*-105*c* of SDK 105 may be implemented on one or more separate computing devices (such as server computing device 107). In these embodiments, mobile computing device 102 can communicate with server computing device 107 via network 106 in order to carry out the functions and processing steps for detecting fraud during biometric identity verification as described herein.

As shown in FIG. 1, processor 104*a* of mobile computing device 102 enables modules 105*a*-105*c* of SDK 105 to communicate with each other, and also coordinates communications with image capture device 103, memory 104*b*, disk storage 104*c*, network 106, and server computing device 107 in order to exchange data for the purpose of performing the described functions. It should be appreciated that any number of computing devices, arranged in a variety of architectures, resources, and configurations (e.g., networked computing, cluster computing, virtual computing, cloud computing) can be used without departing from the scope of the technology described herein. The exemplary functionality of SDK 105 and its modules 105*a*-105*c* is described in detail throughout this specification.

Communications network 106 enables the other components of the system 100 to communicate with each other in order to perform the process of detecting fraud during biometric identity verification as described herein. Network 106 may be a local network, such as a LAN, or a wide area network, such as the Internet and/or a cellular network. In some embodiments, network 106 is comprised of several discrete networks and/or sub-networks (e.g., cellular to Internet) that enable the components of the system 100 to communicate with each other.

Server computing device 107 is a combination of hardware, including one or more special-purpose processors and one or more physical memory modules, and specialized software modules that execute on one or more processors of server computing device 107, to receive data from and transmit data to other components of system 100, and perform functions for detecting fraud during biometric identity verification as described herein. Server computing device 107 includes embedding generation module 107*a* and fraud detection module 107*b* that execute on and/or interact with the processor(s) of server computing device 107. In some embodiments, embedding generation module 107*a* and fraud detection module 107*b* are specialized sets of computer software instructions programmed onto one or more dedicated processors in server computing device 107 and can include specifically-designated memory locations and/or registers for executing the specialized computer software instructions. Although embedding generation module 107*a* and fraud detection module 107*b* are shown in FIG. 1 as executing within a single server computing device 107, in some embodiments the functionality of modules 107*a*-107*b* can be distributed among a plurality of server computing devices. As shown in FIG. 1, server computing device 107 enables embedding generation module 107*a* and fraud detection module 107*b* to communicate with each other in order to exchange data for the purposes of performing the described functions. It should be appreciated that any number of computing devices, arranged in a variety of architectures, resources, and configurations (e.g., cluster computing, virtual computing, cloud computing) can be used without departing from the scope of the invention. Exemplary functionality of embedding generation module 107*a* and fraud detection module 107*b* is described in detail throughout the specification.

Remote computing device 108 is a combination of hardware, including one or more special-purpose processors and one or more physical memory modules, and specialized software modules that execute on one or more processors of remote computing device 108, to receive data from and transmit data to other components of system 100, and perform functions for detecting fraud during biometric identity verification as described herein. In some embodiments, remote computing device 108 is operated by a user that seeks to confirm whether a user of mobile computing device 102 is genuine (e.g., a real, live user) or fraudulent (e.g., a spoofed user). Remote computing device 108 can receive a fraud detection decision from mobile computing device 102 during a remote identity verification process, and device 108 can display the fraud detection decision to a user of remote computing device 108 (e.g., via a display screen) so that the user can take appropriate action, if necessary.

FIG. 2 is a flow diagram of a computerized method 200 of detecting fraud during biometric identity verification, using system 100 of FIG. 1. A user of mobile computing device 102 can connect to, e.g., server computing device 107 via network 106 during an identity verification process where a user at remote computing device 108 seeks to confirm that the user at device 102 is genuine. The user of mobile computing device 102 launches an application to capture (step 202) video of the user's face. As can be appreciated, in some embodiments, the video comprises a video stream or video file with a sequence of images (also called frames). In some embodiments, the video must be of a minimum length or duration (e.g., three seconds) and with a minimum frames-per-second value (e.g., 30 FPS). As can be appreciated, encoding in a video is very different from encoding single images and in some cases video encoding is lossy. Therefore, in some embodiments, the images are not captured as a video stream or video file, but instead are captured as a sequence of single images. When the images are captured as single images, image capture module 103 may trigger a separate autofocus loop for each image. As can be understood, embodiments, techniques, algorithms and examples are provided throughout this specification which refer to capture and analysis of a video stream or video file; however, these embodiments, techniques, algorithms and examples are equally applicable to a sequence of individual images.

During video capture, face detection and tracking module 105a can prompt the user to move their head in relation to mobile device 102 (and/or to move mobile device 102 while keeping the user's head still) in order to capture video of the user's face from each of a plurality of different angles and/or perspectives. As can be appreciated, remote identity verification presents a number of usability challenges so that the expectations and abilities of users, the limitations of mobile device capabilities, and the signals that must be obtained are balanced to validate liveness and prevent fraud. Prior approaches typically rely on user actions that are either too complicated (resulting in user dropoff) or did not result in signals that can be used effectively by AI models to identify the liveness of the user or prevent a variety fraud attacks. Therefore, an important component of face detection and tracking module 106a is a user interface that combines low-friction user action with real-time success feedback to efficiently capture multiple angles of the user's face to process for identity verification and fraud determination.

Face detection and tracking module 105a can display a user interface during capture of the video that directs the user via graphical indicators (e.g., arrows, boxes, etc.) to rotate, tilt, and/or otherwise move their head in particular directions or degrees of freedom. As can be appreciated, while each frame of the video is being captured by image capture device 103, processor 104a transmits the captured frame in real-time to SDK 105 for facial analysis and fraud detection processing—thereby enabling mobile computing device 102 to continuously perform the fraud detection decision process described herein based upon currently captured frames and, when SDK 105 has reached a predetermined confidence threshold with respect to enabling modules 107a-107b of server computing device 107 to make a fraud detection decision, SDK 105 can end the video capture process automatically. Also, the continuous capture and processing of frames allows face detection and tracking module 105a to dynamically generate movement instructions for display to the user during video capture. These movement instructions prompt the user to move their head (and/or to move device 102) in a manner so that certain head pose(s) that are the most useful to increase the fraud detection decision confidence value are captured. As can be appreciated, this technique beneficially minimizes user interaction only to the extent needed to make a fraud detection decision, while also maintaining robustness against spoofing or impersonation attempts.

Figure 8:
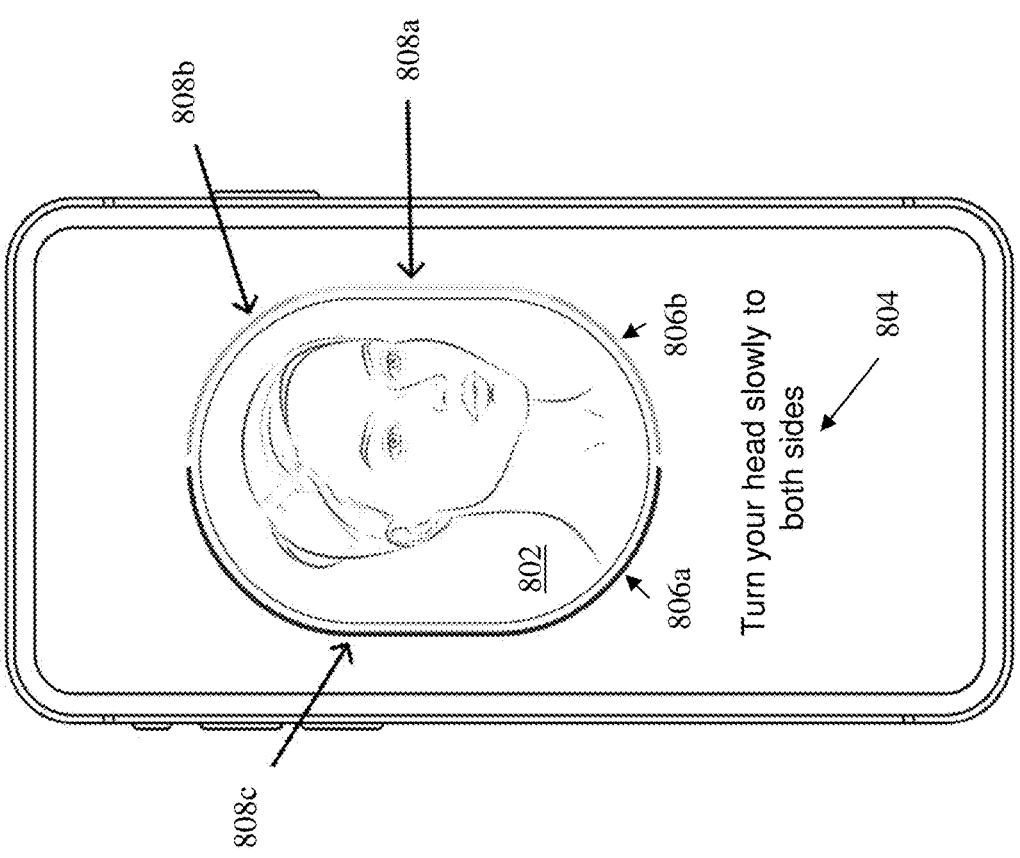
FIG. 8 is a diagram of an exemplary user interface for directing the user's head movement during video capture.

FIG. 8 is a diagram of an exemplary user interface 800 generated by face detection and tracking module 105a for directing the user's head movement during video capture. As shown in FIG. 8, user interface 800 displays the captured video of the user's face 802 in the center of the screen and provides instructions 804 to the user that directs the user to rotate their head in one or more directions (e.g., to the left, to the right, to both sides, etc.). As the user rotates their head, module 105a tracks the rotation (yaw angle) of the head, with 0 being the value for a front view of the face. When the user turns their head to the left or right, user interface 800 presents visual indicators 806a, 806b to provide feedback to the user in real-time as to the completion progress of the video capture. For example, when video capture begins, visual indicators 806a, 806b can be shown as lines with a specified thickness and/or color (e.g., light gray line 808a) to indicate that the user has not completed the required rotation on the corresponding side. Then (as shown in FIG. 8), the user begins turning her head to the left, i.e., toward the right side of the user interface with visual indicator 806b. As the user's head turns, visual indicator 806b changes color and/or thickness (e.g., dark gray line 808b), starting from the top and bottom of the face 802 and building toward the right side of the face. User interface 800 can also integrate granular haptic feedback (e.g., vibrations) as part of the completion progress conveyed to the user, in addition to changes in color and/or thickness. FIG. In some embodiments, the user must turn their head a minimum number of degrees (e.g., 45 degrees for Apple® iOS™-based devices; 25 degrees for Android™-based devices) to complete a given side. As can be appreciated, the number of degrees required can depend upon a specific library that is used by module 105a and the number of degrees may be independent of a particular operating system. Once a side is filled out completely, the corresponding visual indicator 806a, 806b changes color and/or thickness again (e.g., black line 808c in indicator 806a) to indicate success. As can be appreciated, the color choice(s) for the visual indicators can vary—in one preferred embodiment, the indicators 806a, and 806b can change to green upon successful completion. In some embodiments, mobile computing device 102 can provide other indicia of successful completion, such as an audible tone and/or a vibration, to ensure that users with varying accessibility challenges can complete the authentication process. Also, in some embodiments face detection and tracking module 105a can implement a process to prevent the visual indicators 806a, 806b from appearing due to inadvertent or unintentional head turns—in one example, module 105a can stop the visual indicators from displaying at all if the user moves their head less than a prescribed amount (e.g., <5 degrees). As a result, the user should only see visual indicators 806a, 806b appear when turning their head on purpose.

Once each side is filled out completely, module 105a can connect the visual indicators 806a, 806b together to form a single outline around the face 802. In some embodiments, user interface 800 can display a graphical icon (e.g., checkmark, thumbs-up, etc.) to indicate success and/or blur out the face 802 area of user interface 800 to emphasize the end of the video capture. In some embodiments, module 105a can instruct the user to repeat the face rotation and video capture process described above in the event that the user does not perform the head turning movement properly. For example, if the user completes both sides of the head turn too quickly (e.g., less than 1.5 seconds overall), module 105a restarts the video capture process to eliminate blurry images of the face.

Figure 3:
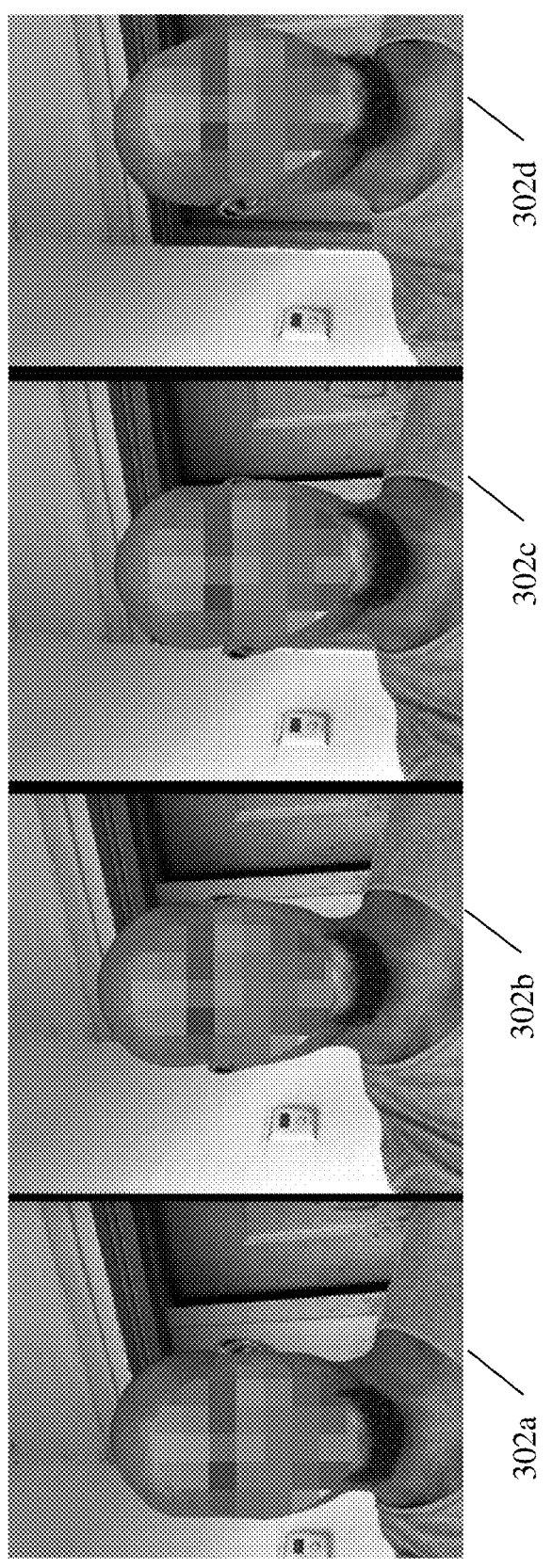
FIG. 3 is a diagram of exemplary frames of a person's face extracted by face detection and tracking module that depict the person's face from a plurality of different poses.

As mentioned above, captured video frames are received by SDK 105 in real-time and face detection and tracking module 105a extracts (step 204) a plurality of frames from the video comprising at least one frame of the person's face from each of a plurality of different angles. In some embodiments, module 105a extracts frames of the person's face for each of several different poses based upon a degree-of-freedom (DoF) framework. Generally, face detection and tracking module 105a seeks to extract frames to maximize a variance of poses of the user's face throughout the video. FIG. 3 is a diagram of exemplary frames of a person's face extracted by face detection and tracking module 105a that depict the person's face from a plurality of different poses. Please note that the exemplary frames of the user's face in FIG. 3 are intentionally blurred out for privacy reasons but would not be blurred in actual use of system 100. As shown in FIG. 3, the user rotates their head from left to right as mobile computing device captures video, and frames 302a-302d represent the user's face from different poses—e.g., in 302a the user's head is rotated to the right, so that the left side of the user's face is visible, in 302b, the user's head is straight. In 302c, the user's head is rotated slightly to the left, so that a portion of the right side of the user's face is visible, and in 302d the user's head is rotated further to the left, so that more of the right side of the user's face is visible.

During video capture, it should be appreciated that some of the frames may not be suitable for facial analysis and fraud detection processing due to certain deficiencies (blurriness, out of focus, glare, etc.) that introduce undesirable noise and thus degrade the image quality such that the user's face and/or one or more of its features cannot be seen or identified adequately. Noise can arise from the image/data acquisition process, such as glare (i.e., oversaturation from a light source), blur, focus, low quality video, white balance, or other image sensor noise (e.g., blooming, readout noise, or custom calibration variations). In other instances, certain frames may not be usable for fraud detection purposes because the angle of the user's face in the frame is too extreme, or the face is partially cut off (and thus the face cannot be properly analyzed). In some embodiments, image preprocessing module 105b can perform a basic video quality check to confirm attributes such as video length, frames per second, resolution, and the like meet or exceed minimum values (and/or fall below maximum values) that are considered adequate by module 105b.

In addition, in some embodiments image preprocessing module 105b analyzes image quality metrics of the frames at a temporal level, at a global quality level, at a local quality level, or any combination thereof. Temporal quality metrics can include, but are not limited to, jitter, motion measurement, etc. As can be appreciated, motion blur can be introduced into one or more images due to image capture device 103 capturing a frame when the user's head and/or mobile device 102 is moving. Image preprocessing module 105b can analyze a sequence of frames and measure motion of the face across frames, then select a subgroup of frames that have a lower amount of motion and discard another subgroup of frames that have a higher amount of motion (or variability of motion). In addition, this approach can be beneficial to reduce the searching space so that SDK 105 can perform more efficiently in locating the face in the images. Global image quality metrics relate to quality characteristics of the image as a whole and can include, but are not limited to, glare, blur, white balance, resolution, sensor noise characteristics such as blooming, readout noise, or custom calibration variations, and the like. Local image quality metrics relate to quality characteristics of certain portions of the frame and can include, but are not limited to, low-level blur, low-level sharpness, and the like.

In some embodiments, image preprocessing module 105b factors each of the above quality metrics when generating an overall quality score for each image, then discards images from the video that do not meet a particular quality score value. For example, image preprocessing module 105b rank each image according to the quality of the image, taking into account such factors as size of the face in the frame, temporal metrics, global quality metrics, local quality metrics, etc. The ranking can be used by image preprocessing module 105b and/or face detection and tracking module 105a to identify one or more frames that have a high likelihood of being processed and classified correctly by the SDK 105.

It should be appreciated that, in some embodiments, image preprocessing module 105b can perform its functions on the incoming frames before face detection and tracking module 105a, or vice versa. In some embodiments, face detection and tracking module 105a and image preprocessing module 105b can operate on incoming frames in parallel to identify a particular subset of frames to be used for 3D reconstruction, embedding generation, and fraud detection decision-making as described herein.

Once the extracted frames have been selected and preprocessed, 3D reconstruction module 105c of SDK 105 creates (step 206) a 3D reconstruction of the person's face from the extracted frames. In some embodiments module 105c uses a keypoint-based process on the extracted frames to creating the 3D reconstruction. FIG. 4 is a flow diagram of a computerized method 400 of creating a 3D reconstruction of the person's face using the extracted frames. 3D reconstruction module 105c generates (step 402) a plurality of keypoints associated with the person's face from each extracted frame. FIG. 5 is a diagram of an exemplary extracted frame of a person's face with keypoints generated by 3D reconstruction module 105c. In FIG. 5, one of the extracted frames 302a from FIG. 3 is shown on the left. Using the extracted frame, 3D reconstruction module 105c generates a plurality of keypoints based upon, e.g., features of the person's face—the keypoints are shown as small circles in frame 502a. It should be appreciated that a portion of frame 502a has been intentionally blurred for anonymization purposes, but in practice the blurred portion would similarly comprise keypoints generated by module 105c.

In some embodiments, 3D reconstruction module 105c generates the keypoints using a deep learning facial analysis approach—such as the MediaPipe Face Mesh software module from Google, Inc. Generally, the MediaPipe Face Mesh software utilizes a machine learning pipeline comprising two real-time deep learning neural networks: a detector to compute face locations from an image and a 3D face landmark model that operates on the face locations and predicts the approximate 3D surface via regression. Typically, the MediaPipe FaceMesh software can generate approximately 400 to 460 3D landmark keypoints for a given facial image, which may be considered a sparse reconstruction. Further detail about the operation of the MediaPipe Face Mesh software is described at google.github-b.io/mediapipe/solutions/face_mesh.html. In some embodiments, 3D reconstruction module 105c can increase the number of keypoints by interpolating between the landmark points generated by MediaPipe to generate a dense reconstruction.

The MediaPipe Face Mesh software uses a 3D Morphable Model (3DMM) approach when computing keypoints—e.g., it tries to detect keypoints by fitting a 3D morphable human mesh to a frame. As can be appreciated, most of the detected keypoints will be biased toward a 3D shape. This bias may allow for 3D reconstruction of a spoofed facial image (i.e., a person wearing a tight-fitting mask that conforms to facial contours). In order to further enhance the robustness of the fraud detection decision described herein, one approach can be to predict facial keypoints for genuine images only, and then modify the image with a 2D deformation and modify the keypoints accordingly. In some embodiments, predicting the facial keypoints can be performed using the correspondence between the keypoints and a UV map of the image. As can be appreciated, MediaPipe can be configured to generate a UV map based upon an input image of a genuine face. Module 105c can then use the texture coordinates in the UV map and determine the texture coordinates that correspond with known model keypoints and predict facial keypoints based upon the correspondence. This approach offers several advantages: (i) with genuine images, the only bias is toward human shapes so module 105c can control the deformation applied (e.g., via homography and fold/curves); and (ii) the keypoint mapping is kept consistent so minimal effort of integration from the MediaPipe pipeline is needed.

Figure 6:
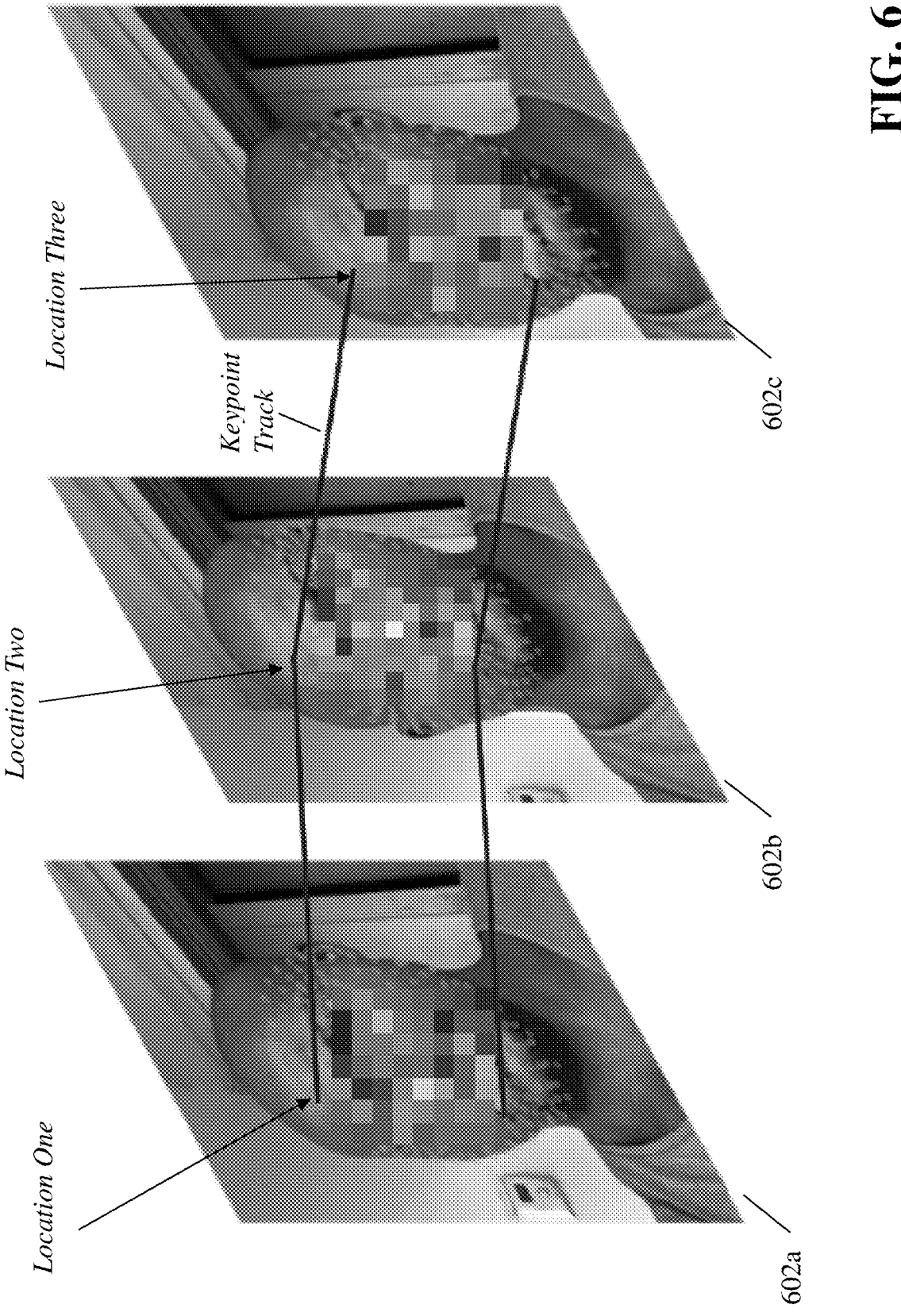
FIG. 6 is a diagram of an exemplary keypoint tracking process performed by 3D reconstruction module.

Turning back to FIG. 4, for each keypoint, 3D reconstruction module 105*c* locates (step 404) the keypoint in each extracted frame and determines (step 406) a relationship between the locations of the keypoint across each extracted frame. This process is also called computing tracks of the keypoints. FIG. 6 is a diagram of an exemplary keypoint tracking process performed by 3D reconstruction module 105*c*. It should be appreciated that portions of the frames 602*a*-602*c* have been intentionally blurred for anonymization purposes, but in practice would not be blurred out. As shown in FIG. 6, 3D reconstruction module 105*c* has generated keypoints for facial features in each extracted frame 602*a*-602*c*. For a given keypoint, module 105*c* locates the keypoint in each different frame 602*a*-602*c* and determines a relationship between the locations of the keypoint across the frames 602*a*-602*c*. As shown, a particular keypoint is located at Location One in frame 602*a*, the same keypoint is located at Location Two in frame 602*b* and at Location Three in frame 602*c*. Because the computed keypoints have a unique ordering and each describes a well-defined facial landmark, related keypoints are matched across frames (e.g., by keypoint number) and the track is automatically generated by module 105*c*. The relationship between the locations (e.g., a difference in location values between each extracted frame in sequence) is defined as the 'track' of the keypoint. As can be appreciated, the tracking process is performed by module 105*c* for each keypoint such that a plurality of tracks is computed by module 105*c* (i.e., one track per keypoint).

Figure 7:
FIG. 7 is a diagram of an exemplary 3D point cloud generated by 3D reconstruction module and a set of camera positions selected by 3D reconstruction module.

Once 3D reconstruction module 105*c* has computed the keypoint tracks, module 105*c* generates (step 408) a point cloud based upon the keypoints and selects (step 410) a plurality of camera positions based upon the relationships between the locations of each keypoint across the extracted frames. An exemplary 3D reconstruction software module that can be used by module 105*c* to reconstruct the 3D point cloud is the open-source StructurefromMotion (SfM) library available at github.com/mapillary/OpenSfM. In selecting the plurality of camera positions, 3D reconstruction module 105*c* performs a triangulation process to find the optimum camera positions that minimize a keypoint reprojection error (i.e., reprojection of the keypoints on the camera space). FIG. 7 is a diagram of an exemplary 3D point cloud generated by 3D reconstruction module 105*c* and a set of camera positions selected by 3D reconstruction module 105*c*. It should be appreciated a portion of the point cloud 702 has been intentionally blurred for anonymization purposes, but in practice would not be blurred out. As shown in FIG. 7, module 105*c* generates an exemplary 3D point cloud 702 and corresponding camera positions 704 where the reprojection error is minimized. In some embodiments, module 105*c* uses a bundle adjustment technique which jointly optimizes camera positions and 3D points. A survey of exemplary bundle adjustment techniques is described in B. Triggs et al., "Bundle Adjustment—A Modern Synthesis," International Workshop on Vision Algorithms, September 2000, Corfu, Greece, pp. 298-372, which is incorporated herein by reference.

As can be appreciated, typically 3D models are not aligned which can lead to issues with embedding generation and classification. For example, several 3D point clouds may have differing scale, orientation, and/or translation. Therefore, prior to providing the 3D point cloud and camera positions to embedding generation module 105*d*, 3D reconstruction module 105*c* normalizes the 3D point cloud. In some embodiments, module 105*c* registers the 3D point cloud by adapting its scale, translation, and/or rotation in order for all 3D point clouds generated by module 105*c* to be aligned. As mentioned above, module 105*c* can utilize MediaPipe to generate the 3D point clouds—and MediaPipe uses a canonical face model (i.e., a static 3D model of a human face) to perform the face landmark detection. Therefore, module 105*c* can align the 3D point clouds by fitting each individual point cloud to be as close as possible to the canonical face model. An exemplary fitting algorithm is the Procrustes analysis, which determines the triplet of (scaling, rotation, translation) that minimizes the difference between the 3D point cloud and the canonical face model.

It should be noted that the 3D reconstruction process described herein advantageously does not rely on multi-purpose landmark detection such as scale-invariant feature transform (SIFT). Instead, as described above, 3D reconstruction module 105*c* uses facial keypoints provided through deep-learning facial analysis to estimate and put in correspondence spatial landmarks from multiple frames. Therefore, module 105*c* does not need to perform nearest neighbor search in order to establish correspondence between landmarks. In addition, using facial landmarks in this way provides increased robustness to textureless regions of the face where the color of the skin is uniform, and to different lighting conditions which often occurs during a head turn. In addition, unlike classical structure-from-motion (SfM) techniques, the 3D reconstruction process described herein leverages facial pose in order to provide a proxy for camera pose. In a sense, the 3D reconstruction process described herein provides a human-centric point of view rather than the classical camera centric point of view generally proposed by prior 3D reconstruction algorithms. Furthermore, starting with the sparse reconstruction of MediaPipe beneficially provides a smaller embedding for robust machine-learning based fraud decision boundaries (as will be described below).

In addition, the 3D reconstruction process described herein provides for greatly reduced noise that typically arises in more traditional 'blind' reconstruction approaches (such as SIFT, Hessian Affine feature point detector and Histogram of Oriented Gradients descriptor (HAHOG), or KAZE). In these prior approaches, patches in the face can often be matched up to patches in the surrounding scene, leading to reconstruction noise. By suppressing this noise, the 3D reconstruction process herein advantageously provides more than a 10× to 100× speed increase in computation of the reconstruction.

Embedding generation module 105*d* receives the 3D point clouds and corresponding camera positions, and the extracted frames of the person's face, from 3D reconstruction module 105*c*. Embedding generation module 105*d* derives (step 208) one or more signals associated with features of the person's face using the extracted frames. In some embodiments, the one or more signals derived from the frame comprise particular contour lines on the person's face, facial regions (e.g., eyes, mouth, nose, etc.), edges, and the like. Module 105*d* can use a deep network that has been trained with a concatenation of facial images and depth maps in, e.g., a Tensorflow (tensorflow.org) framework. For example, the deep network can be trained with flat reconstruction (2D masks) against genuine.

After deriving the signals, SDK 105 transmits the extracted frames, the 3D reconstruction, and the signals to embedding generation module 107*a* of server computing device 107. Embedding generation module 107*a* generates (step 210) an embedding for each extracted frame using the extracted frames, the 3D reconstruction, and the signals. Generally, the embedding comprises a multidimensional vector (e.g., 128 numeric values or features) that represents characteristics of the corresponding frame—thereby incorporating aspects such as facial features, regions, etc. In some embodiments, embedding generation module 107*a* passes the extracted frame, the 3D reconstruction for the frame, and the derived signals for the frame to an ensemble of deep learning neural networks to calculate the embedding for the frame. Typically, the embeddings are calculated using a deep residual convolutional neural network implemented in a deep learning framework such as Tensorflow. The neural network can be trained to use these embeddings to make a genuine/spoof decision. Embedding generation module 107*a* transmits the generated embedding for the extracted frame to fraud detection module 107*b* for classification.

Fraud detection module 107*b* receives the embedding from module 107*a* for analysis in making a fraud detection decision (i.e., whether the person in the frame is genuine or fraudulent). As part of the decision process, module 107*b* uses the embedding as input to a classification model to determine, e.g., whether the frame is likely to depict a genuine person or not. Along with the output from the classification model, fraud detection module 107*b* also analyzes other information associated with the extracted frame in order to compute (step 210) a fraud confidence value for the frame. In some embodiments, module 107*b* analyzes face information—such as face pose, size, and face detection confidence—to enhance the fraud detection decision. For example, if module 107*b* determines that the size or pose of the face in the extracted frame is not consistent with expected or normal values, module 107*b* can determine and/or update a fraud confidence value for the frame (e.g., a very small face size can indicate a spoofing attempt so the fraud confidence value can increase). In some embodiments, fraud detection module 107*b* can analyze one or more image quality measures for the extracted frame. For example, if an extracted image and/or portions of the image are blurry, have brightness values that are unusual (such as glare, shininess, or darkness of certain portions), or have contrast values that seem inconsistent with a genuine person, module 105*e* can determine that the fraud confidence value should increase. In some embodiments, the classification algorithm is a machine learning model such as logistic regression or a random forest, trained on a dataset of genuine and spoof videos. Module 107*b* combines the decision and through the knowledge (or bias) it has been given through training, module 107*b* is able to make a decision.

In some embodiments, fraud detection module 107*b* aggregates the fraud confidence values associated with each extracted frame to generate an overall fraud confidence value. For example, a single extracted frame may have a high fraud confidence value (indicating the possibility that the frame depicts a spoofing attempt), but after processing of several more frames from the video which have low fraud confidence values (indicating that the frames are likely to depict a genuine person), the overall fraud confidence value may meet or exceed a predetermined threshold that can contribute to a decision by module 107*b* that the person is genuine.

In some embodiments, fraud detection module 107*b* can use the above information (e.g., 3D reconstruction, image quality attributes, and face characteristics) in conjunction with one or more additional biometric-related elements captured by mobile computing device 102 and transmitted to module 107*b* in order to confirm whether the person at mobile device 102 is genuine. For example, most smartphones are equipped with one or more sensors (such as gyroscopes and accelerometers) that can sense, track, and capture movement of the mobile device 102—even very minimal movements that may naturally occur as a user is holding the device. Fraud detection module 107*b* can receive and analyze movement characteristics of the mobile device 102 from one or more of these sensors during recording of the facial video in order to generate an enhanced fraud detection decision. In one example, a fraudster may have positioned the mobile device 102 on a tripod or other stationary apparatus so that the mobile device 102 is completely motionless during capture of a spoofing attempt (e.g., a 2D picture). When the video is captured, fraud detection module 107*b* can determine that the device 102 is not detecting any movement (e.g., rotation, acceleration) that is indicative of a person actually holding the device in their hand. Combined with the determined fraud confidence value from the 3D reconstruction and embedding process, fraud detection module 107*b* can use the movement characteristics (or lack thereof) to increase or decrease the confidence value accordingly. In some embodiments, SDK 105 can prompt the user of mobile computing device 102 to hold the device or move the device in a certain fashion based upon the detected movement characteristics—in order to ensure that a real person is using the device.

Using the fraud confidence value and the embedding classification for each extracted frame, fraud detection module 107*b* computes (step 212) a fraud detection decision based upon the fraud confidence values and the embeddings for the extracted frames. As explained above, an exemplary classification algorithm used by module 107*b* is a machine learning model such as logistic regression or a random forest. Also, in some embodiments fraud detection module 107*b* performs the fraud decision process in real-time during the video capture process until a predefined fraud decision confidence has been reached. For example, each extracted frame is analyzed using the techniques described above in order to establish and/or continually update a fraud confidence value for the video. Until the predefined fraud decision confidence has been reached, SDK 105 guides the user of mobile device 102 to capture additional head poses and angles that would be most useful to increase the decision confidence. Once the confidence threshold has been reached, SDK 105 ends the capture process and a final genuine/spoof decision is returned to the relevant party (e.g., the user of device 102 and or the user of remote device 108).

In one example, SDK 105 can generate a user interface screen for display on mobile computing device 102 and/or remote computing device 108 that provides a visual indicator of the fraud detection decision to a user of the corresponding device. The user interface screen can include any of a number of different attributes (e.g. colors, shapes, text, etc.) that enables the user to quickly understand the fraud detection decision. For example, when fraud is not detected in the video, the user interface can display a message in green text, a checkmark, etc. When fraud is detected in the video, the user interface can display a message in red text, an 'X', etc.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the technology by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, and/or other communication protocols.

Devices of the computing system can include, for example, a computer, a computer with a browser device, a telephone, an IP phone, a mobile device (e.g., cellular phone, smartphone, personal digital assistant (PDA) device, laptop computer, electronic mail device), and/or other communication devices. The browser device includes, for example, a computer (e.g., desktop computer, laptop computer) with a World Wide Web browser (e.g., Microsoft® Internet Explorer® available from Microsoft Corporation, Mozilla® Firefox available from Mozilla Corporation). Mobile computing devices include, for example, iOS™-based devices such as the iPhone™ and iPad™ available from Apple, Inc., and Android™-based devices such as the Galaxy™ available from Samsung Corp., the Pixel™ available from Google, Inc., and the Kindle Fire™ available from Amazon, Inc.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

What is claimed is:

1. A computer system for detecting fraud during biometric identity verification, the system comprising a mobile computing device coupled to an image capture device and a server computing device, the mobile computing device configured to:

capture, using the image capture device, video comprising a plurality of frames of a person's face;

extract, from the video, at least two frames of the person's face from each of a plurality of different angles;

create a three-dimensional reconstruction of the person's face using the extracted frames;

derive one or more signals associated with features of the person's face using the extracted frames; and the server computing device configured to:

generate an embedding for each extracted frame using the extracted frames, the three-dimensional reconstruction, and the derived signals;

calculate, for each extracted frame, a fraud confidence value based upon the embedding for the extracted frame, one or more attributes of the person's face, and one or more image quality attributes of the extracted image; and compute a fraud detection decision for one or more of the extracted frames based upon the fraud confidence values and the embeddings.

2. The system of claim 1, wherein, during capture of the video, the mobile computing device generates instructions for movement of the person's head in one or more directions relative to the image capture device.

3. The system of claim 2, wherein the instructions comprise a user interface for display to the person, the user interface comprising:

a view of the person's face, a first visual indicator on a left side of the view of the person's face, and a second visual indicator on a right side of the view of the person's face, wherein one or more appearance characteristics of the first visual indicator change as the person's head rotates to the right, and wherein one or more appearance characteristics of the second visual indicator change as the person's head rotates to the left.

4. The system of claim 3, wherein the first visual indicator and the second visual indicator each comprises a line.

5. The system of claim 4, wherein:

one or more of a color or a thickness of at least a portion of the line for the first visual indicator changes as the person's head rotates to the right, and one or more of a color or a thickness of at least a portion of the line for the second visual indicator changes as the person's head rotates to the left.

6. The system of claim 5, wherein:

the entire line for the first visual indicator changes color and thickness when the person's head has rotated a minimum number of degrees to the right, and the entire line for the second visual indicator changes color and thickness when the person's head has rotated a minimum number of degrees to the left.

7. The system of claim 6, wherein the mobile computing device generates one or more of an audible alert or a haptic alert when the person's head has rotated a minimum number of degrees to the right and a minimum number of degrees to the left during capture of the video.

8. The system of claim 6, wherein the mobile computing device stops capturing the video when the person's head has rotated a minimum number of degrees to the right and a minimum number of degrees to the left.

9. The system of claim 8, wherein the mobile computing device determines that the captured video comprises enough frames to enable the server computing device to compute a fraud detection decision prior to stopping the video capture.

10. The system of claim 8, wherein the mobile computing device restarts the video capture when the mobile computing device determines that the captured video does not comprise enough frames to enable the server computing device to compute a fraud detection decision.

11. The system of claim 1, wherein creating a three-dimensional reconstruction of the person's face using the extracted frames comprises:

generating a plurality of keypoints associated with one or more geometrical locations on the person's face from each extracted frame, wherein the geometrical locations are associated with higher levels of 3D variation;

for each keypoint:

locating the keypoint in each extracted frame, and determining a relationship between the locations of the keypoint across the extracted frames;

generating a point cloud based upon the keypoints; and selecting a plurality of camera positions based upon the relationships between the locations of the keypoints across the extracted frames, wherein for each extracted frame, an orientation of the camera is biased toward a face orientation.

12. The system of claim 11, wherein the camera positions are selected based upon a minimized reprojection error for the associated keypoints.

13. The system of claim 11, wherein generating a plurality of keypoints associated with one or more geometrical locations on the person's face from each extracted frame comprises:

identifying one or more facial landmarks of the person's face, the facial landmarks collectively covering the full face; and generating one or more keypoints corresponding to each of the facial landmarks.

14. The system of claim 13, wherein the mobile computing device removes one or more keypoints that are located outside of the person's face.

15. The system of claim 1, wherein deriving one or more signals associated with features of the person's face using the extracted frames comprises:

determining one or more features of the person's face using the extracted frames; and deriving the one or more signals based upon the determined features of the person's face.

16. The system of claim 15, wherein the one or more features of the person's face comprise contour lines of the person's face, regions of the person's face, or both.

17. The system of claim 1, wherein generating an embedding for each extracted frame using the extracted frames, the three-dimensional reconstruction, and the derived signals comprises, for each extracted frame:

executing a machine learning classification model using the extracted frame, the three-dimensional reconstruction, and the derived signals as input to generate the embedding.

18. The system of claim 17, wherein the machine learning classification model comprises an ensemble of supervised and unsupervised neural networks.

19. The system of claim 1, wherein the one or more attributes of the person's face for calculating the confidence value comprise face pose, face size, and face detection confidence.

20. The system of claim 1, wherein the one or more image quality attributes of the extracted image comprise image corrections, white balance, brightness, blurriness, and contrast.

21. The system of claim 1, wherein the fraud confidence values associated with each extracted frame are aggregated to generate an overall fraud confidence value.

22. The system of claim 21, wherein computing a fraud detection decision based upon the fraud confidence values for one or more of the extracted frames comprises:

comparing the overall fraud confidence value to a fraud confidence threshold;

determining that the person in the video is genuine when the overall fraud confidence value falls below the fraud confidence threshold; and determining that the person in the video is fraudulent when the overall fraud confidence value meets or exceeds the fraud confidence threshold.

23. The system of claim 1, wherein the mobile computing device displays the fraud detection decision to the person.

24. The system of claim 1, wherein the server computing device transmits the fraud detection decision to a remote computing device for display to a user of the remote computing device.

25. The system of claim 1, wherein one or more sensors coupled to the mobile computing device record movement characteristics of the mobile computing device during capture of the video by the image capture device.

26. The system of claim 25, wherein the movement characteristics include rotation and acceleration.

27. The system of claim 25, wherein the server computing device uses the recorded movement characteristics as input when computing the fraud detection decision.

28. A computerized method of detecting fraud during biometric identity verification, the method comprising:

capturing, using an image capture device coupled to a mobile computing device, video comprising a plurality of frames of a person's face;

extracting, by the mobile computing device from the video, at least two frames of the person's face from each of a plurality of different angles;

creating, by the mobile computing device, a three-dimensional reconstruction of the person's face using the extracted frames;

deriving, by the mobile computing device, one or more signals associated with features of the person's face using the extracted frames;

generating, by a server computing device, an embedding for each extracted frame using the extracted frames, the three-dimensional reconstruction, and the derived signals;

calculating, by the server computing device for each extracted frame, a fraud confidence value based upon the embedding for the extracted frame, one or more attributes of the person's face, and one or more image quality attributes of the extracted image; and computing, by the server computing device, a fraud detection decision for one or more of the extracted frames based upon the fraud confidence values and the embeddings.

29. The method of claim 28, wherein, during capture of the video, the mobile computing device generates instructions for movement of the person's head in one or more directions relative to the image capture device.

30. The method of claim 29, wherein the instructions comprise a user interface for display to the person, the user interface comprising:

a view of the person's face, a first visual indicator on a left side of the view of the person's face, and a second visual indicator on a right side of the view of the person's face, wherein one or more appearance characteristics of the first visual indicator change as the person's head rotates to the right, and wherein one or more appearance characteristics of the second visual indicator change as the person's head rotates to the left.

31. The method of claim 30, wherein the first visual indicator and the second visual indicator each comprises a line.

32. The method of claim 31, wherein:

one or more of a color or a thickness of at least a portion of the line for the first visual indicator changes as the person's head rotates to the right, and one or more of a color or a thickness of at least a portion of the line for the second visual indicator changes as the person's head rotates to the left.

33. The method of claim 32, wherein:

the entire line for the first visual indicator changes color and thickness when the person's head has rotated a minimum number of degrees to the right, and the entire line for the second visual indicator changes color and thickness when the person's head has rotated a minimum number of degrees to the left.

34. The method of claim 33, wherein the mobile computing device generates one or more of an audible alert or a haptic alert when the person's head has rotated a minimum number of degrees to the right and a minimum number of degrees to the left during capture of the video.

35. The system of claim 33, wherein the mobile computing device stops capturing the video when the person's head has rotated a minimum number of degrees to the right and a minimum number of degrees to the left.

36. The system of claim 35, wherein the mobile computing device determines that the captured video comprises enough frames to enable the server computing device to compute a fraud detection decision prior to stopping the video capture.

37. The system of claim 35, wherein the mobile computing device restarts the video capture when the mobile computing device determines that the captured video does not comprise enough frames to enable the server computing device to compute a fraud detection decision.

38. The method of claim 28, wherein creating a three-dimensional reconstruction of the person's face using the extracted frames comprises:

generating a plurality of keypoints associated with one or more geometrical locations on the person's face from each extracted frame, wherein the geometrical locations are associated with higher levels of 3D variation;

for each keypoint:

locating the keypoint in each extracted frame, and determining a relationship between the locations of the keypoint across the extracted frames;

generating a point cloud based upon the keypoints; and selecting a plurality of camera positions based upon the relationships between the locations of the keypoints across the extracted frames, wherein for each extracted frame, an orientation of the camera is biased toward a face orientation.

39. The method of claim 38, wherein the camera positions are selected based upon a minimized reprojection error for the associated keypoints.

40. The method of claim 38, wherein generating a plurality of keypoints associated with the person's face from each extracted frame comprises:

identifying one or more facial landmarks of the person's face, the facial landmarks collectively covering the full face; and generating one or more keypoints corresponding to each of the facial landmarks.

41. The method of claim 38, wherein the mobile computing device removes one or more keypoints that are located outside of the person's face.

42. The method of claim 28, wherein deriving one or more signals associated with features of the person's face using the extracted frames comprises:

determining one or more features of the person's face using the extracted frames; and deriving the one or more signals based upon the determined features of the person's face.

43. The method of claim 42, wherein the one or more features of the person's face comprise contour lines of the person's face, regions of the person's face, or both.

44. The method of claim 28, wherein generating an embedding for each extracted frame based upon the extracted frames, the three-dimensional reconstruction, and the derived signals comprises, for each extracted frame:

executing a machine learning classification model using the extracted frame, the three-dimensional reconstruction, and the derived signals as input to generate the embedding.

45. The method of claim 44, wherein the machine learning classification model comprises an ensemble of supervised and unsupervised neural networks.

46. The method of claim 28, wherein the one or more attributes of the person's face for calculating the confidence value comprise face pose, face size, and face detection confidence.

47. The method of claim 28, wherein the one or more image quality attributes of the extracted image comprise image corrections, white balance, brightness, blurriness, and contrast.

48. The method of claim 28, wherein the fraud confidence values associated with each extracted frame are aggregated to generate an overall fraud confidence value.

49. The method of claim 48, wherein computing a fraud detection decision based upon the fraud confidence values for one or more of the extracted frames comprises:

comparing the overall fraud confidence value to a fraud confidence threshold;

determining that the person in the video is genuine when the overall fraud confidence value falls below the fraud confidence threshold; and determining that the person in the video is fraudulent when the overall fraud confidence value meets or exceeds the fraud confidence threshold.

50. The method of claim 28, wherein the mobile computing device displays the fraud detection decision to the person.

51. The method of claim 28, wherein the server computing device transmits the fraud detection decision to a remote computing device for display to a user of the remote computing device.

52. The method of claim 28, wherein one or more sensors coupled to the mobile computing device record movement characteristics of the mobile computing device during capture of the video by the image capture device.

53. The method of claim 52, wherein the movement characteristics include rotation and acceleration.

54. The method of claim 52, wherein the server computing device uses the recorded movement characteristics as input when computing the fraud detection decision.

* * * * *